United States Patent [19]
Witherell

[11] Patent Number: 6,132,305
[45] Date of Patent: Oct. 17, 2000

[54] PORTABLE GAME ANIMAL HANGER

[76] Inventor: Michael W. Witherell, 1443 Oregon Ave., Klamath Falls, Oreg. 97601

[21] Appl. No.: 09/353,960

[22] Filed: Jul. 15, 1999

[51] Int. Cl.[7] .................................. A22B 1/00; A22B 7/00
[52] U.S. Cl. ........................... 452/192; 452/189; 452/197
[58] Field of Search ..................................... 452/192, 189, 452/190, 187, 197

[56] References Cited

U.S. PATENT DOCUMENTS

| | | | |
|---|---|---|---|
| 1,485,161 | 2/1924 | Blake | 452/192 |
| 2,411,856 | 12/1946 | Haring | 452/192 |
| 4,027,357 | 6/1977 | Morris | 452/192 |
| 4,580,317 | 4/1986 | Timothy | 452/187 |
| 4,581,790 | 4/1986 | Horvath | 452/192 |
| 5,071,389 | 12/1991 | Castle et al. | 452/192 |
| 5,288,265 | 2/1994 | Beason et al. | 452/192 |
| 5,938,521 | 8/1999 | Jasek et al. | 452/192 |

*Primary Examiner*—Willis Little

[57] ABSTRACT

A portable game animal hanger for hanging a game animal thereon to facilitate skinning and cleaning of the game animal. The portable game animal hanger includes a pair of elongate arms each has proximal and distal ends. The proximal ends of the arms are pivotally coupled together. Each of the arms has a hook extent adjacent the distal end of the respective arm. The arms each have a shackle hole adjacent the proximal end. The shackle holes are coaxially aligned when the arms are positioned in an extended position. A shackle is also included having a spaced apart pair of finger portions and an arcuate portion connecting the finger portions together. The finger portions of the shackle each have a securing hole therethrough. The proximal ends of the arms are positioned between the finger portions of the shackle. A securing bolt is extended through the securing holes of the finger portions and the shackle holes of the arms when the arms are positioned in the extended position such that the securing bolt holds the arms in the extended position.

7 Claims, 2 Drawing Sheets

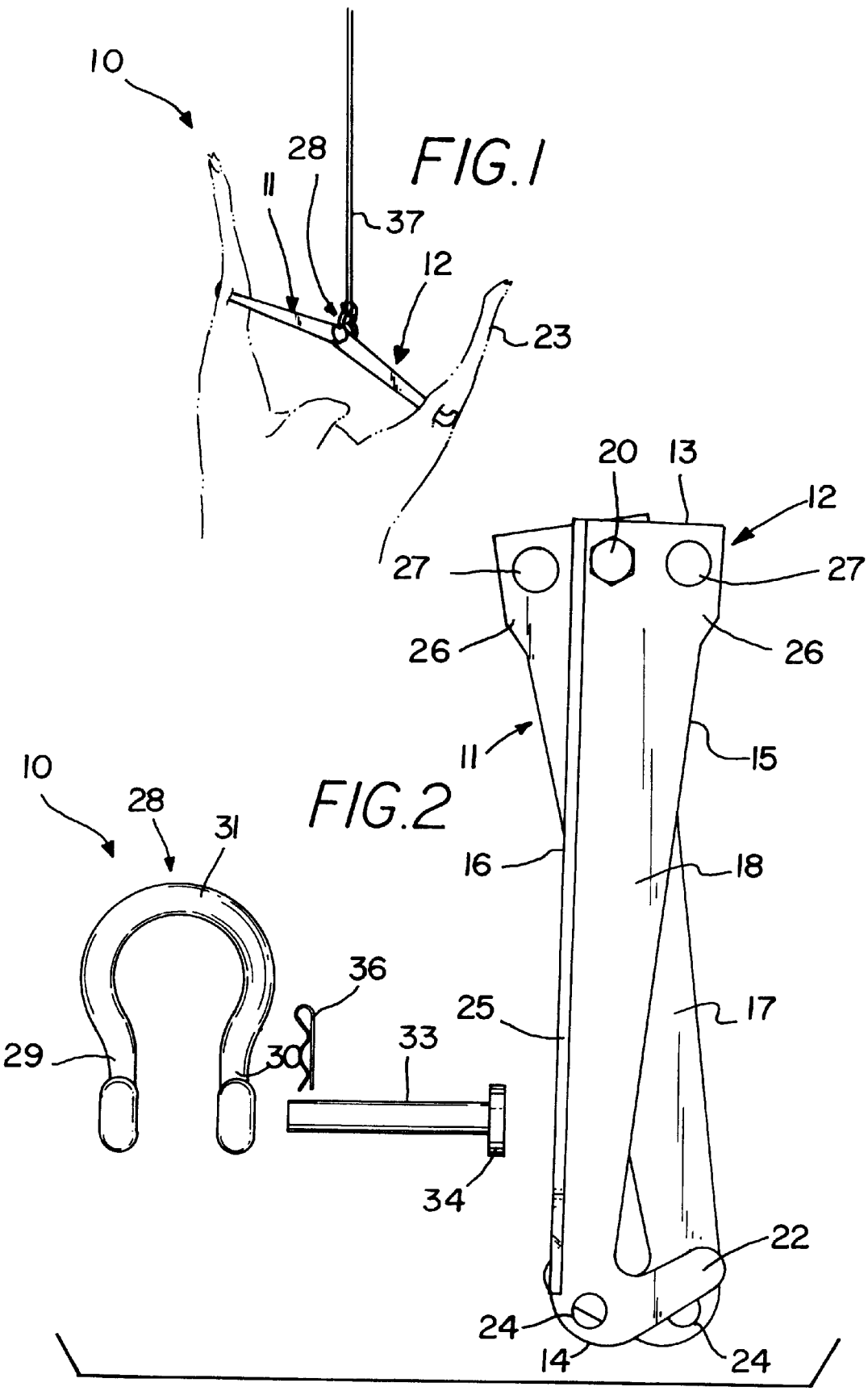

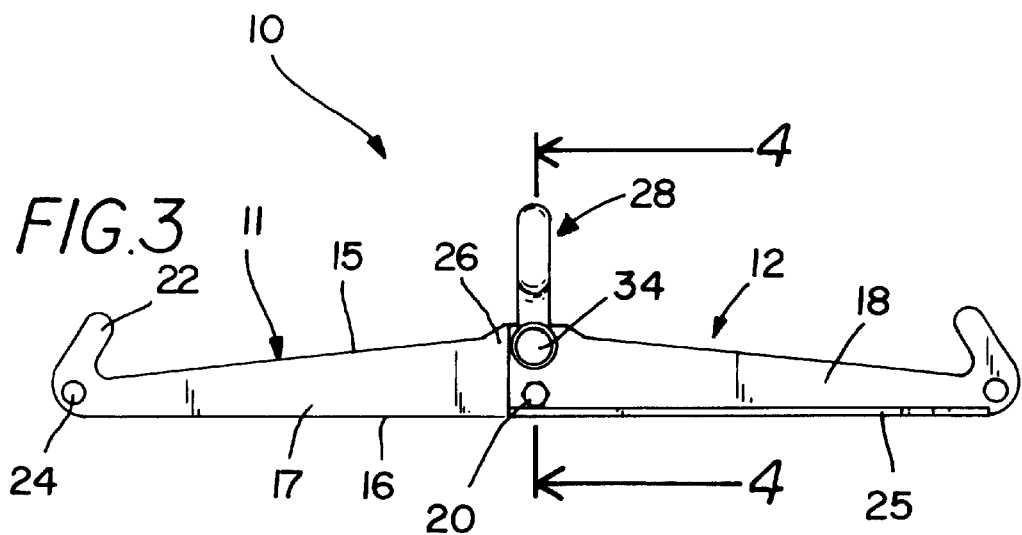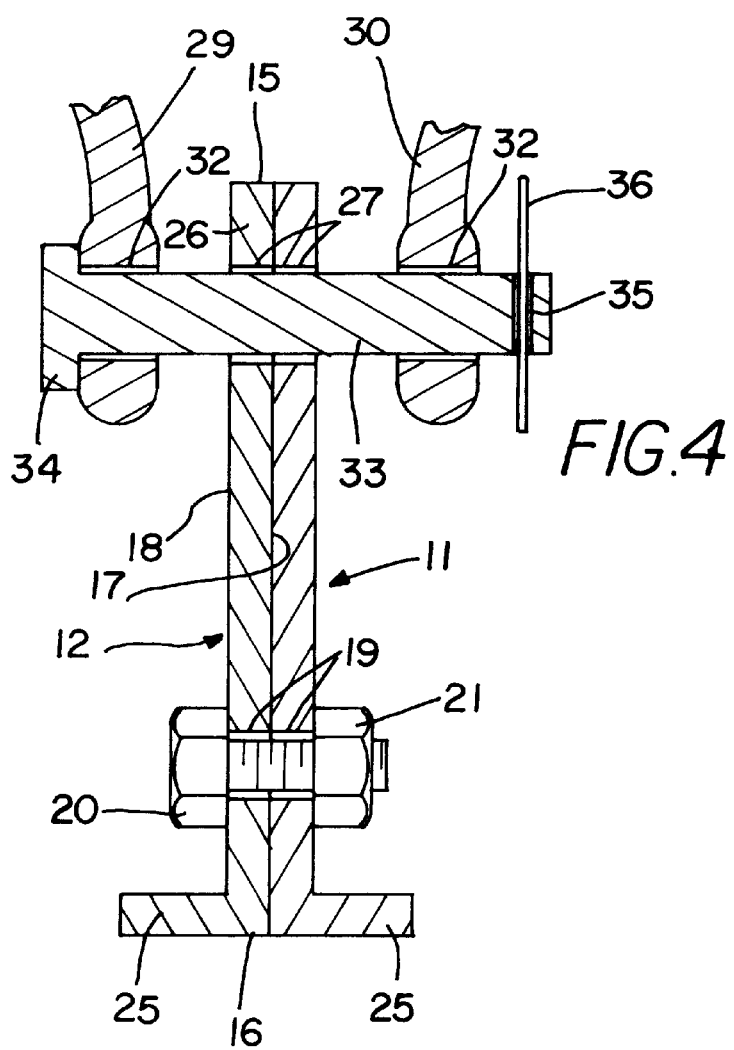

PORTABLE GAME ANIMAL HANGER

BACKGROUND OF THE INVENTION

1. Field of the Invention

The present invention relates to animal hangers and more particularly pertains to a new portable game animal hanger for hanging a game animal thereon to facilitate skinning and cleaning of the game animal.

2. Description of the Prior Art

The use of animal hangers is known in the prior art. More specifically, animal hangers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,182,004; 3,820,195; 5,049,110; 5,417,609; 5,145,224; and 3,137,030.

While these devices fulfill their respective, particular objectives and requirements, the aforementioned patents do not disclose a new portable game animal hanger. The inventive device includes a pair of elongate arms each has proximal and distal ends. The proximal ends of the arms are pivotally coupled together. Each of the arms has a hook extent adjacent the distal end of the respective arm. The arms each have a shackle hole adjacent the proximal end. The shackle holes are coaxially aligned when the arms are positioned in an extended position. A shackle is also included having a spaced apart pair of finger portions and an arcuate portion connecting the finger portions together. The finger portions of the shackle each have a securing hole therethrough. The proximal ends of the arms are positioned between the finger portions of the shackle. A securing bolt is extended through the securing holes of the finger portions and the shackle holes of the arms when the arms are positioned in the extended position such that the securing bolt holds the arms in the extended position.

In these respects, the portable game animal hanger according to the present invention substantially departs from the conventional concepts and designs of the prior art, and in so doing provides an apparatus primarily developed for the purpose of hanging a game animal thereon to facilitate skinning and cleaning of the game animal.

SUMMARY OF THE INVENTION

In view of the foregoing disadvantages inherent in the known types of animal hangers now present in the prior art, the present invention provides a new portable game animal hanger construction wherein the same can be utilized for hanging a game animal thereon to facilitate skinning and cleaning of the game animal.

The general purpose of the present invention, which will be described subsequently in greater detail, is to provide a new portable game animal hanger apparatus and method which has many of the advantages of the animal hangers mentioned heretofore and many novel features that result in a new portable game animal hanger which is not anticipated, rendered obvious, suggested, or even implied by any of the prior art animal hangers, either alone or in any combination thereof.

To attain this, the present invention generally comprises a pair of elongate arms each has proximal and distal ends. The proximal ends of the arms are pivotally coupled together. Each of the arms has a hook extent adjacent the distal end of the respective arm. The arms each have a shackle hole adjacent the proximal end. The shackle holes are coaxially aligned when the arms are positioned in an extended position. A shackle is also included having a spaced apart pair of finger portions and an arcuate portion connecting the finger portions together. The finger portions of the shackle each have a securing hole therethrough. The proximal ends of the arms are positioned between the finger portions of the shackle. A securing bolt is extended through the securing holes of the finger portions and the shackle holes of the arms when the arms are positioned in the extended position such that the securing bolt holds the arms in the extended position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable game animal hanger apparatus and method which has many of the advantages of the animal hangers mentioned heretofore and many novel features that result in a new portable game animal hanger which is not anticipated, rendered obvious, suggested, or even implied by any of the prior art animal hangers, either alone or in any combination thereof.

It is another object of the present invention to provide a new portable game animal hanger which may be easily and efficiently manufactured and marketed.

It is a further object of the present invention to provide a new portable game animal hanger which is of a durable and reliable construction.

An even further object of the present invention is to provide a new portable game animal hanger which is susceptible of a low cost of manufacture with regard to both materials and labor, and which accordingly is then susceptible of low prices of sale to the consuming public, thereby making such portable game animal hanger economically available to the buying public.

Still yet another object of the present invention is to provide a new portable game animal hanger which provides in the apparatuses and methods of the prior art some of the advantages thereof, while simultaneously overcoming some of the disadvantages normally associated therewith.

Still another object of the present invention is to provide a new portable game animal hanger for hanging a game animal thereon to facilitate skinning and cleaning of the game animal.

Yet another object of the present invention is to provide a new portable game animal hanger which includes a pair of elongate arms each has proximal and distal ends. The proximal ends of the arms are pivotally coupled together. Each of the arms has a hook extent adjacent the distal end of the respective arm. The arms each have a shackle hole adjacent the proximal end. The shackle holes are coaxially aligned when the arms are positioned in an extended position. A shackle is also included having a spaced apart pair of finger portions and an arcuate portion connecting the finger portions together. The finger portions of the shackle each have a securing hole therethrough. The proximal ends of the arms are positioned between the finger portions of the shackle. A securing bolt is extended through the securing holes of the finger portions and the shackle holes of the arms when the arms are positioned in the extended position such that the securing bolt holds the arms in the extended position.

Still yet another object of the present invention is to provide a new portable game animal hanger that is collapsible to permit easy and compact transport of the hanger which is especially useful for use in the rugged terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new portable game animal hanger according to the present invention.

FIG. 2 is a schematic side view of the present invention in the folded position.

FIG. 3 is a schematic side view of the present invention in the extended position.

FIG. 4 is a schematic cross sectional view of the present invention taken from line 4—4 of FIG. 3.

DESCRIPTION OF THE PREFERRED EMBODIMENT

With reference now to the drawings, and in particular to FIGS. 1 through 4 thereof, a new portable game animal hanger embodying the principles and concepts of the present invention and generally designated by the reference numeral 10 will be described.

As best illustrated in FIGS. 1 through 4, the portable game animal hanger 10 generally comprises a pair of elongate arms each has proximal and distal ends. The proximal ends of the arms are pivotally coupled together. Each of the arms has a hook extent adjacent the distal end of the respective arm. The arms each have a shackle hole adjacent the proximal end. The shackle holes are coaxially aligned when the arms are positioned in an extended position. A shackle is also included having a spaced apart pair of finger portions and an arcuate portion connecting the finger portions together. The finger portions of the shackle each have a securing hole therethrough. The proximal ends of the arms are positioned between the finger portions of the shackle. A securing bolt is extended through the securing holes of the finger portions and the shackle holes of the arms when the arms are positioned in the extended position such that the securing bolt holds the arms in the extended position.

In closer detail, the animal hanger 10 includes a pair of elongate arms 11,12 each having proximal and distal ends 13,14, top and bottom edges 15,16 extending between the proximal and distal ends of the respective arm, and substantially planar first and second side faces 17,18. In one illustrative embodiment, each arm may have a length of about 15 inches defined between the proximal and distal ends of the respective arm.

The proximal ends of the arms are pivotally coupled together such that the first side faces of the arms abut each other. In use, the arms is pivotable between an extended portion (see FIGS. 1 and 3) and a folded position (see FIG. 2).

In one embodiment, the arms each has a circular pivot hole 19 extending therethrough between the side faces of the respective arm and positioned adjacent the proximal end of the respective arm. The pivot holes are coaxially aligned with each other. A threaded pivot bolt 20 is extended through the pivot holes of the arms and a nut 21 is threaded on to the pivot bolt to pivotally couple the proximal ends of the arms together.

Each of the arms has a hook extent 22 adjacent the distal end of the respective arm. As best illustrated in FIG. 3, each hook extent is outwardly extended from the top edge of the respective arm and towards the proximal end of the respective arm. The hook extent of each arm is extended at an acute angle to the bottom edge of the respective arm. With reference to FIG. 1, in use, the hook extents are designed for extending through appendages of a game animal 23 when the arms are positioned in the extended position so that the game animal may be suspended from the arms.

Each arm may also have a generally circular tie hole 24 extending therethrough between the side faces of the respective arm and positioned adjacent the distal end of the respective arm below the associated hook extent. The tie holes are designed for looping a flexible elongate element such as rope, wire or string therethrough and around the adjacent appendage of the game animal to secure the game animal to the arms.

In one embodiment, the top and bottom edges of each arm may converge towards one another in a direction towards the distal end of the respective arm. In such an embodiment, the top and bottom edges of each arm are extended at an acute angle. The convergence of the top and bottom edges forms a taper to each arm to help bias (by gravity) the adjacent appendage of the game away from the proximal end and towards the distal end to abut against the hook extent in a secure manner to help prevent the appendage from sliding off of the arm. In one illustration of this embodiment, the acute angle may be between about 3 degrees and about 15 degrees for providing a satisfactory taper for hanging game thereon.

The second side face of each arm may have an outwardly extending elongate reinforcing flange 25 extending between the proximal and distal ends of the respective arm for providing additional structural strength to the arms to prevent their bending and buckling. The reinforcing flange of each arm is extended along the bottom edge of the respective arm. The reinforcing flange of each arm may also lie in a plane substantially perpendicular to the second face of the respective arm.

In one embodiment, the top edges of the arms each may have an upper extent 26 upwardly extending therefrom adjacent the proximal end of the respective arm.

The arms each have a generally circular shackle hole 27 extending therethrough between the side faces of the respective arms and positioned adjacent the proximal end and top edge of the respective arm with a portion of each shackle hole extending into the upper extent of the respective arm. The shackle holes are coaxially aligned when the arms are positioned in the extended position.

As best illustrated in FIGS. 2 and 4, the animal hanger also includes a generally horseshoe-shaped shackle 28 having a spaced apart pair of finger portions 29,30 and a generally C-shaped arcuate portion 31 connecting the finger portions together. The finger portions of the shackle each have a securing hole 32 therethrough adjacent a terminal end of the respective finger portion. The securing holes of the finger portions are coaxially aligned with each other.

The proximal ends of the arms are positioned between the finger portions of the shackle so that the securing holes are coaxially aligned when the shackle holes when the arms are portioned in the extended position.

A securing bolt 33 is extended through the securing holes of the finger portions and the shackle holes of the arms when the arms are positioned in the extended position so that the securing bolt holds the arms in the extended position. The securing bolt has a pair of opposite ends. One end of the securing bolt may have a disk-shaped head 34 with a diameter greater than that of a securing hole of a finger portion while the other end of the securing bolt may have a lateral hole 35 therethrough.

A cotter pin 36 is extended through the lateral hole. The finger portions are interposed between the head of the securing bolt and the pin when the securing pin is extended through the securing holes and the shackle holes to prevent removable of the securing bolt therefrom.

As illustrated in FIG. 1, an elongate flexible element 37 such as a rope or cable may have an end coupled (by tying) to the arcuate portion of the shackle and another end designed for suspending from a structure so that the arms and the game animal attached thereto are suspended from the structure as well.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal hanger, comprising:

a pair of elongate arms each having proximal and distal ends;

said proximal ends of said arms being pivotally coupled together;

each of said arms having a hook extent adjacent said distal end of the respective arm, each hook extent being outwardly extended from a top edge of the respective arm and towards said proximal end of the respective arm;

said arms each having a shackle hole adjacent said proximal end;

said shackle holes being coaxially aligned when said arms are positioned in an extended position;

a shackle having a spaced apart pair of finger portions and an arcuate portion connecting said finger portions together;

said finger portions of said shackle each having a securing hole therethrough;

said proximal ends of said arms being positioned between said finger portions of said shackle; and a securing bolt being extended through said securing holes of said finger portions and said shackle holes of said arms when said arms are positioned in said extended position such that said securing bolt holds said arms in said extended position.

2. The animal hanger of claim 1, wherein said arms each having a pivot hole, said pivot holes being coaxially aligned with each other, a pivot bolt being extended through said pivot holes of said arms to pivotally couple said proximal ends of said arms together.

3. The animal hanger of claim 1, wherein each arm has a tie hole positioned adjacent said distal end of the respective arm.

4. The animal hanger of claim 1, wherein each of said arms has an outwardly facing face, said outwardly facing face of each arm having elongate reinforcing flange extending between said proximal and distal ends of the respective arm.

5. The animal hanger of claim 4, wherein said reinforcing flange of each arm is extended along said bottom edge of the respective arm.

6. The animal hanger of claim 5, wherein said reinforcing flange of each arm lies in a plane substantially perpendicular to said second face of the respective arm.

7. An animal hanger, comprising:

a pair of elongate arms each having proximal and distal ends, top and bottom edges extending between said proximal and distal ends of the respective arm, and first and second substantially planar side faces;

said proximal ends of said arms being pivotally coupled together such that said first side faces of said arms abut each other;

said arms each having a circular pivot hole extending therethrough between said side faces of said the respective arm and positioned adjacent said proximal end of the respective arm, said pivot holes being coaxially aligned with each other;

a threaded pivot bolt being extended through said pivot holes of said arms and a nut being threaded on to said pivot bolt to pivotally couple said proximal ends of said arms together;

said arms being pivotable between extended and folded positions;

each of said arms having a hook extent adjacent said distal end of the respective arm, each hook extent being outwardly extended from said top edge of the respective arm and towards said proximal end of the respective arm;

said hook extent of each arm being extended at an acute angle to said bottom edge of the respective arm;

each arm having a generally circular tie hole extending therethrough between said side faces of the respective arm and positioned adjacent said distal end of the respective arm;

said second side face of each arm having an outwardly extending elongate reinforcing flange extending between said proximal and distal ends of the respective arm;

said reinforcing flange of each arm being extended along said bottom edge of the respective arm;

said reinforcing flange of each arm lying in a plane substantially perpendicular to said second face of the respective arm;

said arms each having a generally circular shackle hole extending therethrough between said side faces of the respective arms and positioned adjacent said proximal end and top edge of the respective arm;

said shackle holes being coaxially aligned when said arms are positioned in said extended position;

a generally horseshoe-shaped shackle having a spaced apart pair of finger portions and a generally C-shaped arcuate portion connecting said finger portions together;

said finger portions of said shackle each having a securing hole therethrough;

said securing holes of said finger portions being coaxially aligned with each other;

said proximal ends of said arms being positioned between said finger portions of said shackle, said securing holes being coaxially aligned when said shackle holes when said arms are portioned in said extended position;

a securing bolt being extended through said securing holes of said finger portions and said shackle holes of said arms when said arms are positioned in said extended position such that said securing bolt holds said arms in said extended position; and an elongate flexible element having an end coupled to said arcuate portion of said shackle.

* * * * *